Patented June 15, 1943

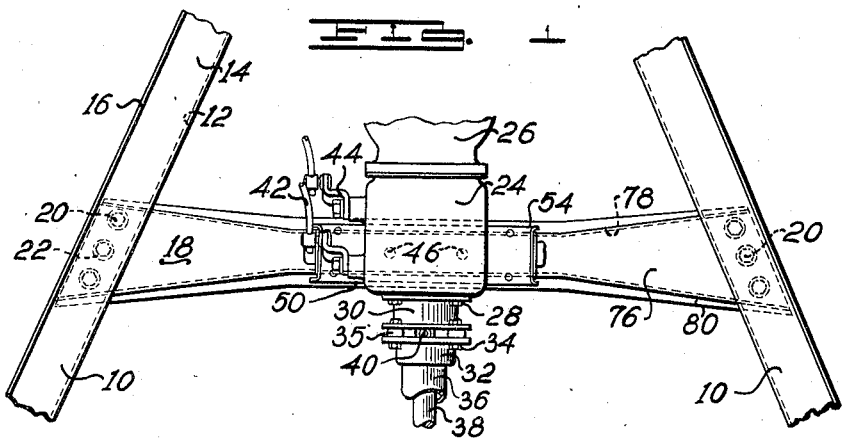
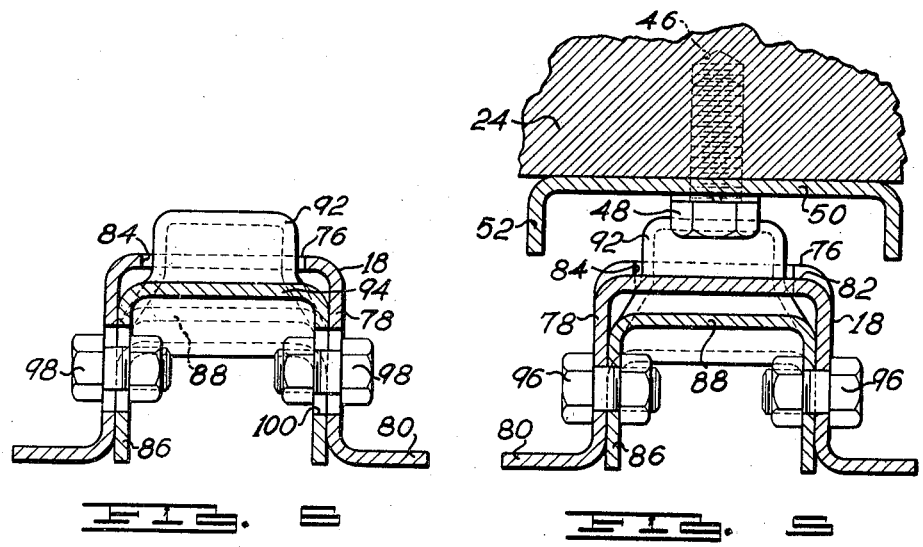

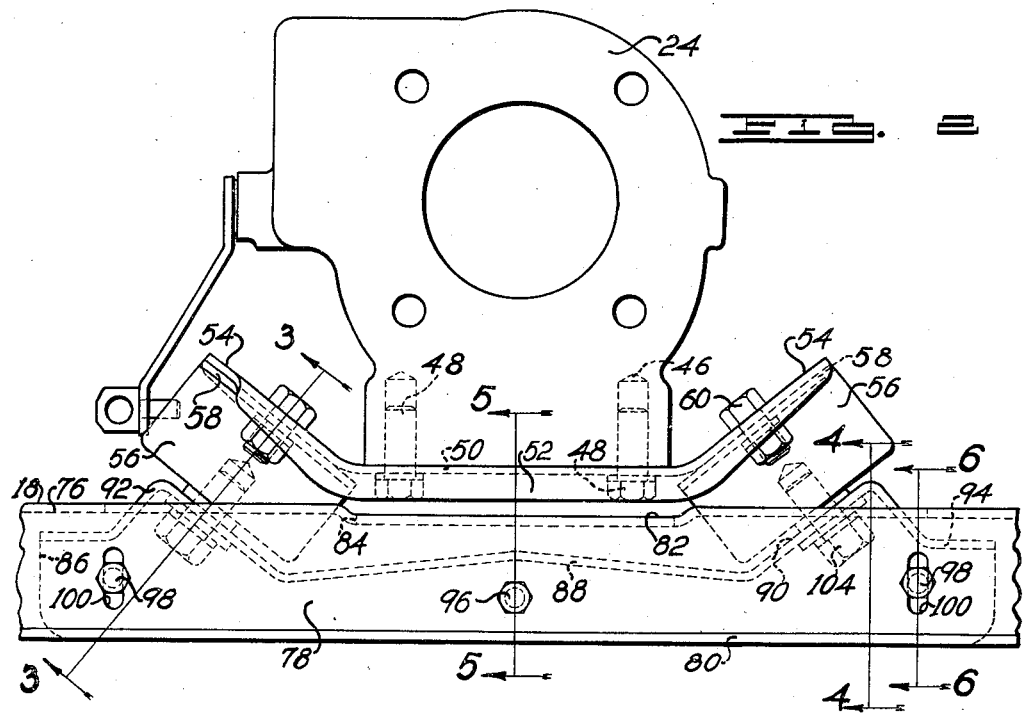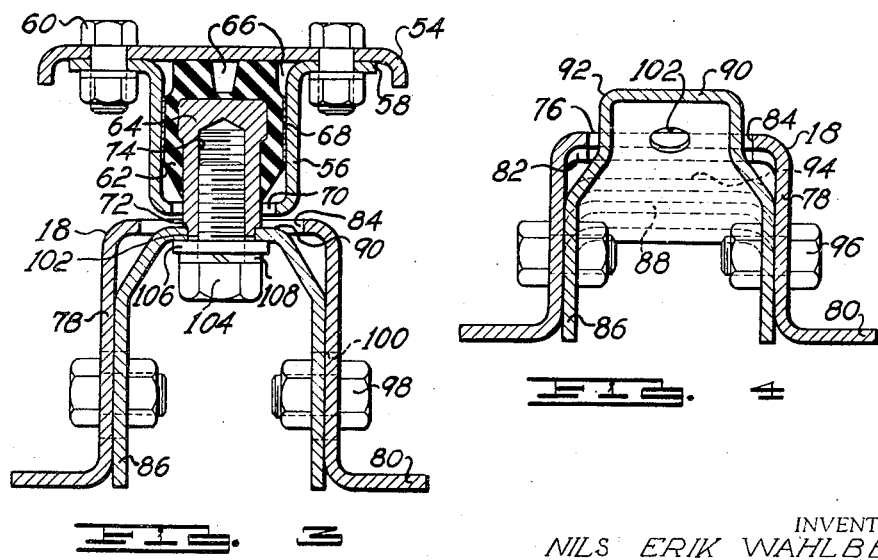

2,321,715

UNITED STATES PATENT OFFICE 2,321,715

MOTOR MOUNT

Nils Erik Wahlberg, Kenosha, Wis., assignor to Nash-Kelvinator Corporation, Kenosha, Wis., a corporation of Maryland Application March 22, 1941, Serial No. 384,609

11 Claims. (Cl. 248—7)

This invention relates to motor mounts and has particular reference to means for mounting an internal combustion motor in an automative vehicle.

The invention is illustrated as being applied to the rear end of an internal combustion motor located in the forward portion of an automotive vehicle; however, it will be understood that the invention will be equally effective if applied to the forward end of a motor or to a motor which is located in another portion of the automobile.

It is an object of this invention to provide a motor support which permits the motor to be self-aligning in the vehicle.

It is another object of this invention to provide a motor support in which the motor is cushioned on rubber or other deformable material to prevent the transmission of vibrations to the vehicle body.

It is another object of this invention to provide a flexible motor mount in which the compression of the flexible members may be equalized before the motor is installed in the vehicle and which will not be thrown out of balance when installed.

It is another object of this invention to provide a flexible motor mount which may be easily and simply adjusted after the motor has been installed in the vehicle so that the flexible portions of the mount are equally loaded.

Other objects and advantages of this invention will be apparent from a consideration of the following description and claims and the attached drawings, of which there are two sheets, and in which—

Figure 1 represents a plan view of a portion of the side rail members of an automotive vehicle and the rear end of the power unit of the vehicle as supported thereby;

Figure 2 represents a rear elevation of the power unit with a portion of its supporting member attached thereto;

Figure 3 represents a sectional view taken along a plane indicated by the line 3—3 in Figure 2 and looking in the direction of the arrows;

Figure 4 represents a sectional view taken along a plane indicated by the line 4—4 in Figure 2 and looking in the direction of the arrows;

Figure 5 represents a sectional view taken along a plane indicated by the line 5—5 in Figure 2 and looking in the direction of the arrows; and Figure 6 represents a sectional view taken along a plane indicated by the line 6—6 in Figure 2 and looking in the direction of the arrows.

Figure 1 illustrates a pair of side rail members 10 which converge toward the front of the vehicle in the usual manner to clear the front steerable wheels of the vehicle (not shown). The side rail members 10 are shown to be of generally channel shaped cross section having an inner web 12 from the upper and lower edges of which the flanges 14 extend outwardly from the center of the vehicle. The outer edges of the flanges 14 may be turned upwardly to form flanges 16. The side rail members 10 may form parts of a separate chassis frame or may be built into the vehicle body as an integral part thereof.

A cross frame member 18 is removably attached to the under surface of the side rails 10 by means of cap screws 20 which are passed through the ends of the cross member 18 and threaded into holes tapped in the bosses 22 formed on the upper surface of the lower flanges 14.

The power plant of the vehicle comprises a transmission housed in the rigid case 24 and a clutch housed in the rigid case 26. The clutch case 26 is rigidly secured to the transmission case 24 and is arranged to be rigidly attached at its forward edge to an internal combustion motor (not shown). Attached to the rear face of the transmission case 24 by means of the cap screws 28 is a cylindrical member 30 which encloses the tail shaft of the transmission and to which a trunnion 32 is yieldably secured by the bolts 34. Rubber washers 35 positioned around the bolts 34 between the cylindrical member 30 and trunnion 32 permit the trunnion to tip slightly about the line of the bolts 34. The trunnion 32 is rotatably secured to the forward end of a torque tube 36 which houses a propeller shaft 38. The propeller shaft 38 is connected to the tail shaft of the transmission by means of a universal joint 40 positioned along the line of bending between the flexibly mounted trunnion 32 and the cylindrical member 30. The transmission is thus arranged to receive the driving and braking thrust from the rear wheels (not shown) through the torque tube 36. The transmission is arranged to be shifted into different gear ratios by means of suitable rods 42 operating the crank members 44 which are attached to rock shafts (not shown) extending into the case 24.

The under surface of the case 24 is provided with a pair of transversely aligned tapped apertures 46 (see Figures 2 and 5) which are arranged to receive the cap screws 48 for rigidly attaching the motor mount plate 50 to the under surface of the case 24. The plate 50 is generally channel shaped in cross section having the flanges 52 bent downwardly from the front and back edge thereof to increase its rigidity. Each end of the plate 50 is bent upwardly to form the wing portions 54.

Each of the wing portion 54 has attached to the underside thereof a generally box-shaped stamping 56. The upper edges of the box-shaped stampings 56 are flanged outwardly as at 58 (see Figure 3) so that the bolts 60 may be passed therethrough to attach the box members to the wings 54. Attention is called to the fact that lines drawn normal to the surfaces of the wings 54, through the box members 56, will converge and pass approximately through the center of the transmission.

Positioned within each box member 56 is a block 62 of rubber or other deformable material within which is bonded a block 64 of metal or other rigid material. The upper surface of the rubber block 62 is cut away as at 66 and strips of friction material 68 are attached to each side thereof in contact with the inside surfaces of the box member 56. The block 64 extends downwardly through an aperture 70 formed in the lower face of the box member 56 and is provided with a cylindrical shoulder 72 for a purpose which will be described presently. The blocks 64 are further apertured and tapped as at 74.

The cross member 18 is generally channel shaped in cross section having an upper web portion 76 from which the side flanges 78 extend downwardly. The lower edges of the side flanges 78 may be turned outwardly in stiffening flanges 80 if so desired. The center of the web portion 76 is offset downwardly as at 82 (see Figures 2 and 5) and is apertured as at 84 on each side of the downwardly offset portion 82.

Nested within the channel shaped cross section of the cross member 18 is a sub-member 86 which is also of downwardly opening, generally channel shaped cross section. The upper surface of the sub-member 86 is provided with a central portion 88 which is substantially below the level of the web 76 of the cross member 18. The ends of the central portion 88 are bent upwardly into inclined surfaces 90 to form the ears 92 which project partially through the apertures 84 in the web portion 76 of the cross member. Beyond the ears 92, the top surface of the sub-member 86 is bent downwardly and extended horizontally as at 94 underneath the web portion 76 of the cross member 18.

The sub-member 86 is secured within the cross member 18 by means of bolts 96 which are passed through the flanges 78 of the cross member and the flanges of the sub-member along the center line of the cross member and sub-member. Additional bolts 98 are passed through the flanged portions of the cross member and sub-member on each side of the center bolts 96 and attention is called to the fact that the apertures in the sub-member through which the bolts 98 extend are elongated to form generally vertical slots 100. If desired, the apertures in the cross member 18 which pass the bolts 98 may also be elongated vertically.

The sloping upper surfaces 90 of the sub-member 86 are apertured as at 102 and are arranged to receive the cylindrical shoulder 72 formed on the lower ends of the blocks 64. A cap screw 104 is passed through each of the apertures 102 and threaded into the tapped holes 74 in the blocks 64 and retains a washer 106 and lock washer 108 against the underside of the sub-member 86. By tightening the bolts 104, the shoulders 72 may be drawn into tight engagement with the upper surfaces 90 of the sub-member 86. The apertures 84 in the cross member 18 are large enough to freely pass the lower portion of the box members 56 and the depressed center portion 82 of the top web 76 of the cross member provides clearance for the heads of the cap screws 48 so that the power unit may be lowered with respect to the cross member.

From the above description it will be apparent that the weight of the power unit attached to the transmission case 24 will be supported by the plate 50 which rests upon the rubber blocks 62. The rubber blocks 62 are supported by the rigid blocks 64 to which they are bonded and which are in turn supported upon the sub-member 86. The sub-member 86 is supported by means of the bolts 96 and 98 upon the cross member 18 which is attached to the side sills 10. The rubber blocks 62 prevent any metal to metal contact between the power unit and the side sills 10 and will cushion the motor vibrations by flexing within the box-shaped members 56. The cut away portions 66 in the upper surface of the rubber blocks 62 provide space for the rubber to flow as it flexes and the friction strips 68 dampen the movement of the rubber block with respect to the box member 56. The sides of the box members 56 bearing against the rubber blocks 62 transmit the driving and braking thrust from the power unit to the cross member 18 and side sills 10.

Attention is called to the fact that the sub-member 86 which connects the cross member 18 to the transmission case 24 is pivotally supported by the bolts 96 while the bolts 98, being positioned in the slots 100, will permit the sub-member 86 to rock relative to the cross member if the bolts 98 are not tightened. It is contemplated that when the power unit is installed in the vehicle, the bolts 98 will be left loose until all of the other connections between the power unit and the vehicle body have been made. In this manner the power unit and transmission case 24 will be free to rock with the sub-member 86 relative to the cross member 18 and assume a free, unstrained position regardless of inaccuracies which may occur in the manufacturing of the side sills 10 or cross member 18 which would otherwise cause the power unit to be clamped in a twisted and strained position. After the power unit has assumed its proper position, the bolts 98 may be tightened to clamp the sub-member 86 in place. Thus the rubber blocks 62 will be equally loaded to properly support the power unit against tortional vibration in either direction.

The particular order in which the parts are assembled to the vehicle body is unimportant to the functioning of the invention as the cross member 18 and sub-member 86 may be first installed on the side sills and the connection between the power unit and the cross member made by installing the cap screws 104 or the entire cross member assembly may be attached to the power unit and assembled from the underside of the vehicle by installing the cap screws 20. It is also apparent that the box members 56 and rubber blocks 62 may be secured to the transmission case by means other than the winged motor support plate 50 without departing from the theory of the invention. If desired, the transmission case 24 may be attached directly to the sub-member 86 without use of a flexible mounting. This type of support may further be attached to the forward end of the power unit or at positions other than underneath the transmission case.

The particular example of the motor support disclosed should be taken as an example only and not as a limitation of my invention to which I make the following claims:

1. In an automobile having load carrying members, a power unit, a cross member extending between two of said load carrying members, mounting brackets capable of supporting vertical loads and transmitting longitudinal thrusts secured to said power unit, connectors carried by said brackets and insulated therefrom by deformable material, a sub-member pivotally supported on said cross member and arranged to transmit longitudinal thrust force thereto, means securing said connectors to said sub-member, and means for rigidly clamping said sub-member to said cross member to prevent pivotal movement therebetween.

2. In an automobile having load carrying members, a cross member removably secured to said load carrying members, said cross member being channel shaped in cross section and defining a pair of apertures in the web portion thereof, a sub-member nested within said cross member below said apertures, means pivotally supporting said sub-member to said cross member, means for clamping an end of said sub-member to said cross member to prevent rotation of said sub-member about said pivotal supporting means, a power unit for said automobile, and means for securing said power unit to said sub-member projecting through said apertures in said cross member.

3. In an automobile having load carrying members, a cross member removably secured to said load carrying members, said cross member being channel shaped in cross section and defining a pair of apertures in the web portion thereof, a sub-member nested within said cross member below said apertures, means pivotally supporting said sub-member to said cross member, means for clamping an end of said sub-member to said cross member to prevent rotation of said sub-member about said pivotal supporting means, a power unit for said automobile, and flexible means for securing said power unit to said sub-member projecting through said apertures in said cross member.

4. In an automobile having frame members, a power unit, a removable frame member, a sub-frame member pivotally supported on said removable member, flexible means securing said power unit to said sub-frame member, means for rigidly clamping said removable frame member to said first mentioned frame members, and means for clamping said sub-frame member to said removable member to prevent relative movement therebetween.

5. In an automobile having load carrying members, a power unit, a plate secured to said power unit, deformable blocks secured to said plate, said blocks having a rigid member bonded therein, a removable cross member arranged to be secured to said load carrying members, a sub-member pivotally supported by said cross member, means for attaching said rigid blocks to said sub-member, and means for clamping said sub-member to said cross member to prevent relative rotation therebetween.

6. In an automobile having side rail members, a cross member removably secured to said side rail members, said cross member being channel shaped in cross section and defining a pair of apertures in the web portion thereof, a sub-member nested within said cross member and having a pair of ear portions projecting through said apertures, means pivotally supporting the center of said sub-member to said cross member, and means clamping an end of said sub-member to said cross member to prevent rotation of said sub-member about said pivotal supporting means.

7. In an automobile having side rail members, a cross member having a downwardly opening channel shaped cross section removably secured to said side rails, the web portion of said cross member defining a pair of apertures, a sub-member having a channel shaped cross section nested within said cross member, ear portions shaped on said sub-member and having downwardly converging surfaces projecting through said apertures, a power unit for said automobile, a pair of flexible mounting means secured to said power unit in planes parallel to the surfaces of said ear portions, means securing said flexible mounting means to said ear portions, pivotal supporting means connecting said sub-member to said cross member, and clamping means for clamping said sub-member to said cross member to prevent rotation of said sub-member about said pivotal supporting means.

8. In an automobile having longitudinally extending side rails, a cross member carried by said side rails and having a top wall defining a pair of apertures and a side wall defining a pair of slots, a sub-member having a top wall positioned below the top wall of said cross member and a side wall positioned adjacent to the side wall of said cross member, means pivotally supporting the side wall of said sub-member to the side wall of said cross member midway between said slots, bolts extending through the side wall of said sub-member and through said slots in said cross member, a power unit for said automobile, and means secured to said power unit projecting through said apertures in said cross member and secured to said sub-member for supporting said power unit on said sub-member.

9. In an automobile having longitudinally extending side rails, a cross member carried by said side rails and having a top wall defining a pair of apertures and a side wall defining a pair of slots, a sub-member having a top wall positioned below the top wall of said cross member and a side wall positioned adjacent to the side wall of said cross member, means pivotally supporting the side wall of said sub-member to the side wall of said cross member midway between said slots, bolts extending through the side wall of said sub-member and through said slots in said cross member, a power unit for said automobile, and flexible means secured to said power unit projecting through said apertures in said cross member and secured to said sub-member for supporting said power unit on said sub-member.

10. In an automobile having longitudinally extending side rails, a cross member secured to said side rails, said cross member having a top surface defining a pair of apertures and a side surface, a sub-member having a top surface positioned below the top surface of said cross member and a side surface positioned adjacent to the side surface of said cross member, the side surface of said sub-member defining a pair of slots, means pivotally supporting the side surface of said sub-member to the side surface of said cross member midway between said slots, bolts extending through the side surface of said cross member and the slots in said sub-member for clamping said side surfaces together, a power unit for said automobile, and means secured to said power unit and projecting through the apertures in said cross member for supporting said power unit on said sub-member.

11. In an automobile having longitudinally extending side rail members, a cross member secured to said side rail members, said cross member having a channel shaped cross section, a sub-member having a channel shaped cross section positioned in nested relationship with said cross member, means pivotally supporting said sub-member on said cross member, clamping means for clamping said sub-member to said cross member to prevent relative rotation therebetween, a power unit for said automobile, and means for supporting said power unit on said sub-member.

NILS ERIK WAHLBERG.